(No Model.)

P. E. GRAHAM.
PLOW ATTACHMENT.

No. 575,233. Patented Jan. 12, 1897.

WITNESSES:

INVENTOR
P. E. Graham.
BY
ATTORNEYS.

UNITED STATES PATENT OFFICE.

PATRICK E. GRAHAM, OF MILLWOOD, MINNESOTA.

PLOW ATTACHMENT.

SPECIFICATION forming part of Letters Patent No. 575,233, dated January 12, 1897.

Application filed April 3, 1896. Serial No. 586,062. (No model.)

*To all whom it may concern:*

Be it known that I, PATRICK E. GRAHAM, of Millwood township, in the county of Stearns and State of Minnesota, have invented a new and Improved Plow Attachment, of which the following is a full, clear, and exact description.

The object of the invention is to provide an attachment for plows, through the medium of which the manure or fertilizer on the ground will be separated and practically distributed in advance of the plowshare, and also to provide a means for holding the manure or fertilizer down firmly at the landside of the plow, and also to provide a means for holding the manure on the sod while it is being turned into the furrow.

The attachment is especially adapted for covering manure, straw, high stubbles, grass, &c., over the ground that is to be plowed in advance of the plow.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1:
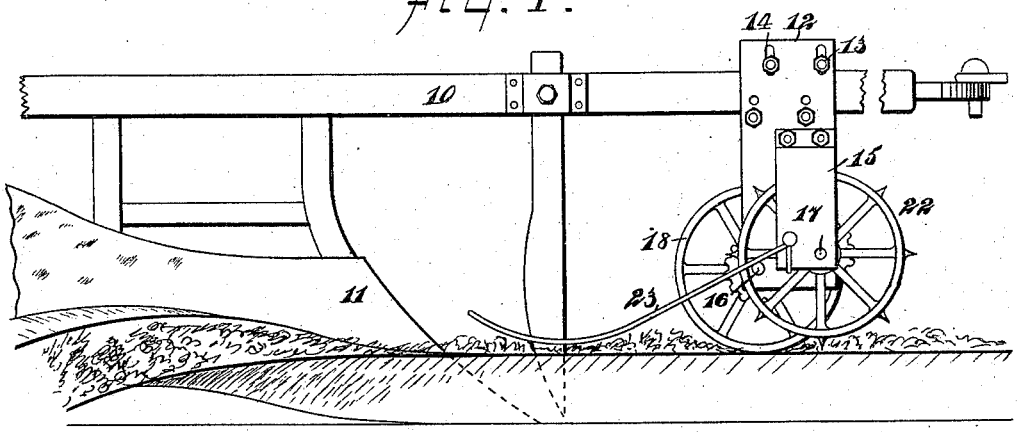
Figure 2:
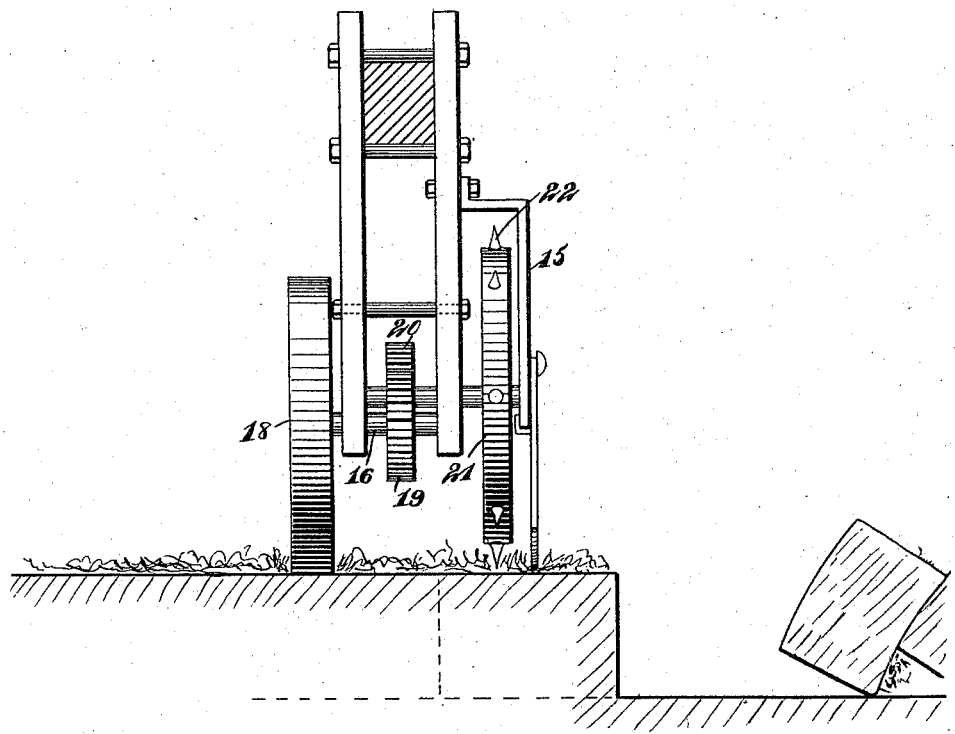

Figure 1 is a side elevation of the attachment applied to a plow; and Fig. 2 is a vertical section through the plow-beam, illustrating the attachment in rear elevation.

In carrying out the invention the beam 10 and the share 11 may be of any approved shape, and the attachment is applied to the beam in front of the plow. The frame of the attachment consists of two plates 12 of desired length, one being at each side of the plow-beam, and the plates are secured firmly in position on the beam by means of bolts 13, or their equivalents, which are passed through elongated slots 14 produced in the plates, so that the plates may be adjusted vertically according to the depth to which the ground is to be plowed, and at the furrow side of the frame a housing 15 is secured in any approved manner, while at the rear bottom portion of the frame a shaft 16 is journaled, and a second shaft 17 is journaled near the forward portion of the frame, the latter shaft extending through the housing 15.

At the landside of the plow a traction-wheel 18 is secured upon the shaft 16, and the said shaft is provided with a pinion 19, meshing with a pinion 20, secured to the forward shaft 17, and within the housing 15 a distributing-wheel 21 is secured to the forward shaft, as shown in Fig. 2. This wheel does not contact with the ground, being slightly above it, and has a number of teeth 22 produced in its periphery.

The traction-wheel 18, running at the land side of the plow, prevents the manure from gathering under the beam when the sod separates from the landside, and the separating-wheel being on the furrow side of the plow and immediately in front of it scatters or distributes the manure preparatory to its being turned over. The separating-wheel turns in a rearward direction as the plow advances.

A spring arm or trailer 23 is secured to the housing 15 and extends rearwardly to a point near the plowshare, and the said trailer tracks in the furrow and presses the manure or straw down as the sod turns upon it.

The device is exceedingly simple, durable, and economic, and, as heretofore stated, may be applied to any plow, and it effectually acts to cause a thorough mixture of the manure with the plowed soil.

Having thus described my invention, I claim as new and desire to secure by Letters Patent—

1. An attachment for plows, comprising a frame, shafts journaled in the said frame one in advance of the other, a traction-wheel secured to one shaft at one side of the frame being adapted to travel at the land side of the plow, a driving connection between the shafts, and a separating and distributing wheel secured to the driven shaft at the opposite side of the frame being located at the furrow side of the plow, as and for the purpose specified.

2. An attachment for plows, comprising a frame arranged for attachment to a plow-beam in advance of the plow, shafts journaled in the said frame one in advance of the other, pinions on the said shaft in mesh with each other, a traction-wheel secured to one shaft and adapted to travel on the ground at the land side of the plow, and a distributing-wheel secured upon the driven shaft being out of engagement with the ground and having peripheral teeth, as and for the purpose set forth.

3. An attachment for plows, comprising a frame arranged to be secured to the plow-beam in advance of the plow and vertically adjustable thereon, a traction-wheel journaled in the said frame at the land side of the plow, and a separating and distributing wheel driven from the traction-wheel and journaled in the frame at the furrow side of the plow and in advance of the traction-wheel, as and for the purpose specified.

4. An attachment for plows, comprising a frame arranged to be secured to the plow-beam in advance of the plow, a traction-wheel journaled in the said frame at the land side of the plow, and a distributing-wheel journaled in the frame at the furrow side of the plow and in advance of the traction-wheel, the distributing-wheel being driven from the traction-wheel and the distributing-wheel turning in a direction the reverse of that of the traction-wheel, the distributing-wheel being also elevated from the ground and provided with peripheral teeth of sufficient length to contact with the surface of the ground, as set forth.

5. An attachment for plows, comprising a frame, a traction-wheel located at the land side of the frame, a distributing-wheel located at the furrow side of the frame, being driven from the said traction-wheel, and a trailing arm also located at the furrow side of the frame, and extending rearwardly therefrom, said trailing arm being adapted to travel in the furrow, as and for the purpose specified.

PATRICK E. GRAHAM.

Witnesses:
HENRY BENOLKEN,
CHRIST. WELLE.